(12) United States Patent
Cheon et al.

(10) Patent No.: US 8,082,445 B2
(45) Date of Patent: Dec. 20, 2011

(54) SECURE NFC APPARATUS AND METHOD FOR SUPPORTING VARIOUS SECURITY MODULES

(75) Inventors: Sung-Rock Cheon, Seoul (KR); Jae-Sic Jeon, Seoul (KR); O-Hyon Kwon, Seoul (KR); Joo-Sik Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 12/796,544

(22) Filed: Jun. 8, 2010

(65) Prior Publication Data
US 2010/0272254 A1 Oct. 28, 2010

Related U.S. Application Data

(62) Division of application No. 11/500,488, filed on Aug. 8, 2006, now abandoned.

(30) Foreign Application Priority Data

Aug. 9, 2005 (KR) .................. 10-2005-0072607

(51) Int. Cl.
*H04L 9/32* (2006.01)
(52) U.S. Cl. ............... 713/172; 713/156; 713/185
(58) Field of Classification Search ............. 713/156, 713/172, 185; 726/9; 705/55, 65; 455/41.1, 455/84
See application file for complete search history.

(56) References Cited

U.S. PATENT DOCUMENTS
6,045,043 A * 4/2000 Bashan et al. ............... 235/441

2002/0022454 A1 * 2/2002 Serra et al. ............... 455/41
2004/0121739 A1 * 6/2004 Suzuki et al. ............. 455/84

OTHER PUBLICATIONS

Phillips; S2C Interface for NFC; "Adding a general purpose interface between NFC and Secure IC to Secure NFC"; Jan. 21, 2005; Survey V1.0; 12 pages.
ECMA; Standard ECMA-352; Near Field Communication Interface and Protocol-2 (NFCIP-2); Dec. 2003; 1st Edition; 8 pages.
Phillips; S2C Interface for NFC; "Adding a general purpose interface between NFC and Secure IC to Secure NFC"; Jan. 21, 2005; Survey V1.0; 12 pages.
Korean Office Action for Korean application No. 10-2005-0072607.

* cited by examiner

*Primary Examiner* — David Pearson
*Assistant Examiner* — Justin T Darrow
(74) *Attorney, Agent, or Firm* — Lowe Hauptman Ham & Berner LLP (57) ABSTRACT

Disclosed herein are a secure Near Field Communication (NFC) apparatus and method for supporting various security modules. The NFC apparatus includes an NFC unit, a protocol conversion unit and a security module. The NFC unit transmits information corresponding to a first signal based on a first protocol via non-contact NFC and generates a second signal based on the first protocol from information received via non-contact NFC. The protocol conversion unit converts a signal based on a second protocol into a first signal based on the first protocol and converts the second signal based on the first protocol into a signal based on the second protocol. The security module receives and outputs signals based on the second protocol.

6 Claims, 11 Drawing Sheets

FIG.1

(prior art)

SECURE NFC APPARATUS AND METHOD FOR SUPPORTING VARIOUS SECURITY MODULES

CROSS REFERENCE TO RELATED APPLICATION

This application is a divisional of U.S. Ser. No. 11/500,488, filed on Aug. 8, 2006. This application, in its entirety, is incorporated herein by reference.

BACKGROUND OF THE INVENTION

1. Field of the Invention

The present invention relates generally to Near Field Communication (NFC) and, more particularly, to an NFC apparatus and method that are capable of supporting general security modules, such as contact type/non-contact type smart card core chips.

2. Description of the Related Art

Figure 1:
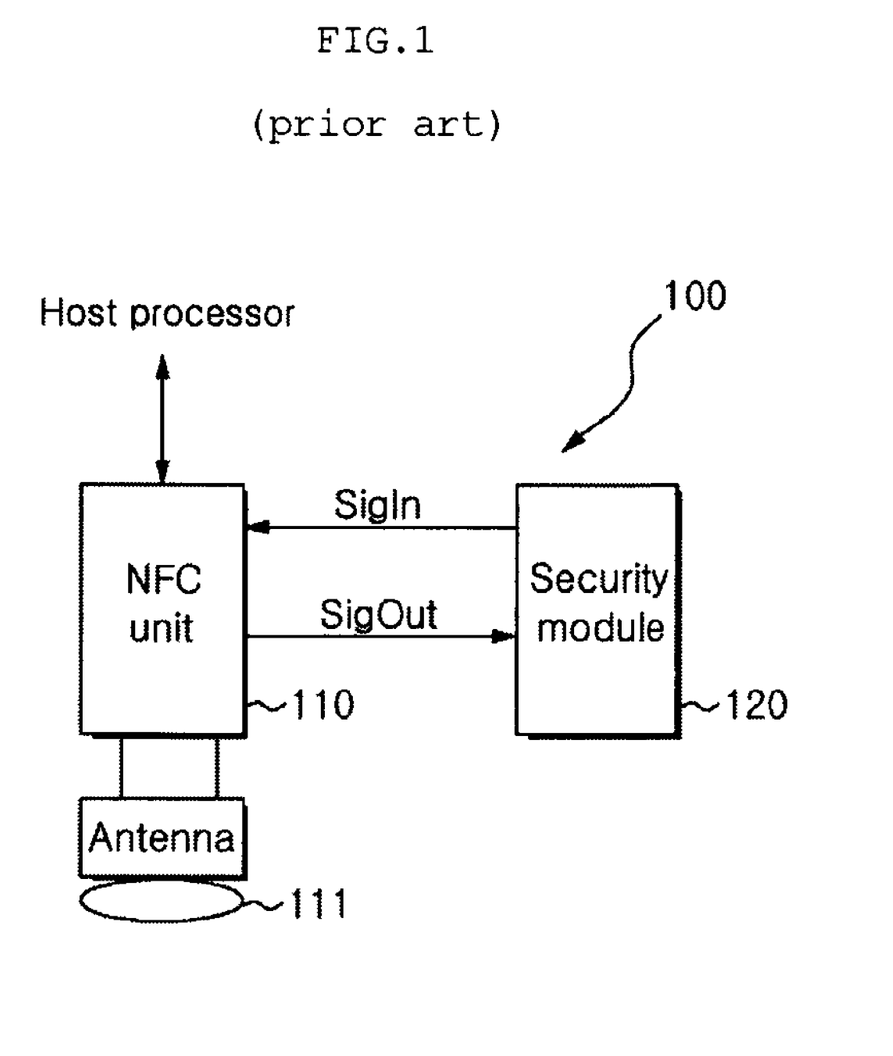
FIG. 1 is a block diagram showing the construction of a conventional secure NFC apparatus.

FIG. 1 is a block diagram showing the construction of a conventional secure NFC apparatus. Referring to FIG. 1, the secure NFC apparatus 100 includes an NFC unit 110 and a security module 120.

The NFC unit 110 may be controlled by the host processor of a mobile communication terminal or the like, and communicates with the security module 120 via signals SigIn and SigOut based on a SigIn-SigOut-Connection (S2C) interface. The security module 120 is a kind of Subscriber Identity Module (SIM), and may store authentication information for user identification. The S2C interface was developed by Philips Electronics for the purpose of communication between the NFC unit 110 and the security module 120.

The secure NFC apparatus 100 may be mounted in a portable terminal, such as a mobile communication terminal. The secure NFC apparatus 100 may perform the function of a traffic card or a smart card.

For example, a user who attempts to pass through a security gate brings a portable terminal equipped with the secure NFC apparatus 100 close to a main body that is installed at the security gate for entry authentication, and authentication information is transmitted to the main body through the antenna 111 of the secure NFC apparatus 100 to be used for entry authentication. If the authentication is successful, the user can pass through the security gate.

Furthermore, a user brings the portable terminal equipped with the secure NFC apparatus close to a reader for authenticating the amount of charged money, and the user can be allowed to use transportation and pay for shopping depending on whether the authentication by the reader is successful.

However, the prior art secure NFC apparatus 100 supports only a security module 120 that communicates with the NFC unit 110 based on the S2C interface. Therefore, in the case where other security authentication modules, such as a contact smart card core chip based on the ISO 7816 protocol or a non-contact smart card core chip based on the ISO 14443 protocol, are used as the security module 120, the interface specifications of the security authentication modules are not compatible with those of the NFC unit 110. Accordingly, data associated with the modules used (for example, authentication information) is not compatible, so there is a problem in that the management of data is inconvenient.

Furthermore, there has been an attempt to make the NFC unit 110 receive data, such as authentication information, and the security module 120 manage the data. However, the scheme related to this attempt was not satisfactory. Furthermore, the scheme encountered difficulty in that it is difficult to manage personal information, such as electronic name cards, managed in a mobile communication terminal because the scheme does not support peer-to-peer data transmission and reception between mobile communication terminals.

SUMMARY OF THE INVENTION

Accordingly, the present invention has been made keeping in mind the above problems occurring in the prior art, and an object of the present invention is to provide a secure NFC apparatus, which performs mutual protocol conversion between the S2C protocol of NFC and the protocols of other security authentication modules such that the security authentication modules, such as a non-contact smart card, which do not follow the S2C protocol of NFC, are compatible with NFC.

Another object of the present invention is to provide a method of converting signals based on the S2C protocol of NFC into a form compatible with the protocols of other security authentication modules, such as a non-contact smart card, and then performing communication.

In order to accomplish the objects, according to an aspect of the present invention, there is provided a secure Near Field Communication (NFC) apparatus, including an NFC unit for transmitting information corresponding to a first signal based on a first protocol via non-contact NFC and generating a second signal based on the first protocol from information received via non-contact NFC; a protocol conversion unit for converting a signal based on a second protocol into a first signal based on the first protocol, and converting the second signal based on the first protocol into a signal based on the second protocol; and a security module for receiving and outputting signals based on the second protocol.

In order to accomplish the objects, according to another aspect of the present invention, there is provided a protocol converter for NFC, including a code conversion unit for bypassing an input signal based on a first protocol, and converting an input signal based on a second protocol into a signal based on the first protocol and outputting the converted signal; a signal type conversion unit for converting the bypassed signal, which is received from the code conversion unit, into an analog signal and outputting the converted analog signal, and converting an analog input signal based on the second protocol into a digital signal and outputting the converted digital signal to the code conversion unit as an input signal based on the second protocol; and a waveform shaping unit for converting the size of the analog signal output from the signal type conversion unit and transferring the converted analog signal to the external module, and converting the size of the analog signal based on the second protocol, which is output from the external module, and outputting the converted analog signal to the signal type conversion unit as the analog input signal based on the second protocol.

In order to accomplish the objects, according to still another aspect of the present invention, there is provided a secure NFC method using an NFC processor for performing interfacing for non-contact NFC and a non-contact smart card core chip for managing authentication information, including the steps of the NFC processor generating a signal based on a first protocol from information received via the non-contact NFC; converting the signal based on the first protocol into a signal based on a second protocol; inputting the signal based on the second protocol to the non-contact smart card core chip; the non-contact smart card core chip outputting the signal based on the second protocol; converting the signal based on the second protocol into a signal based on the first protocol; and the NFC processor transmitting information corresponding to the signal based on the first protocol via the non-contact NFC.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will now be described in detail in connection with preferred embodiments with reference to the accompanying drawings. Like reference symbols indicate the same or similar components.

Figure 2:
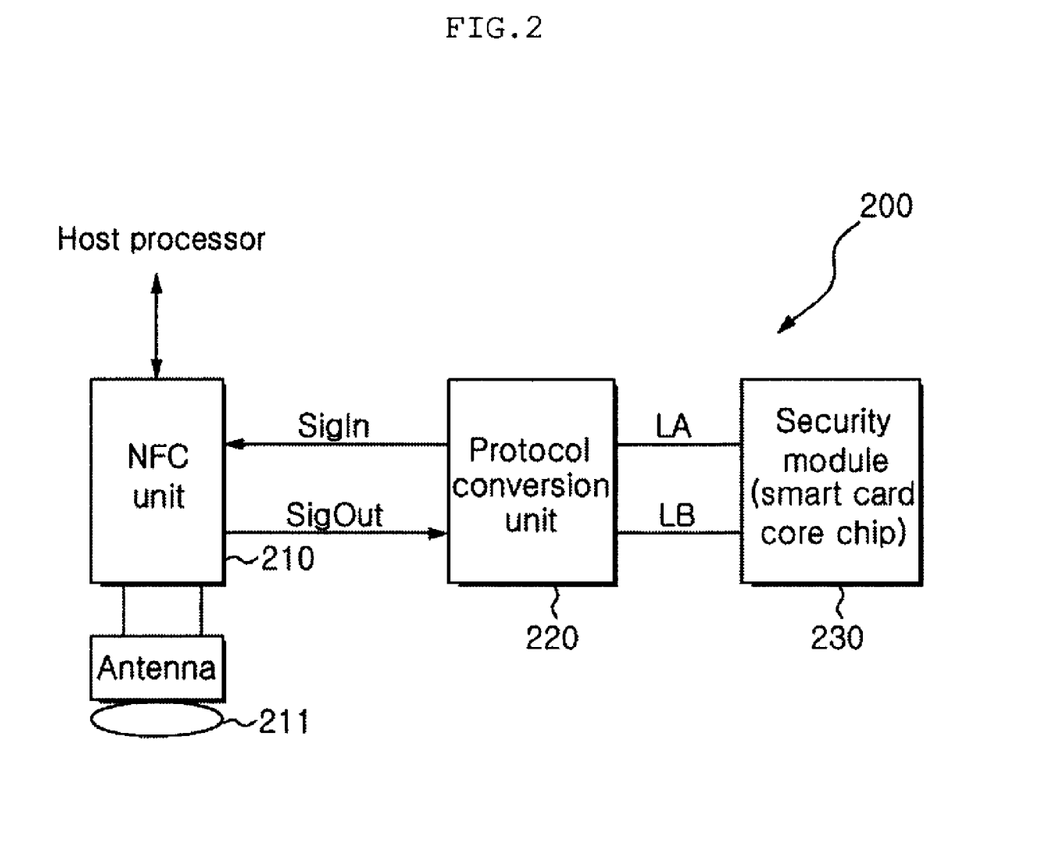
FIG. 2 is a block diagram showing the construction of a secure NFC apparatus according to an embodiment of the present invention.

FIG. 2 is a block diagram showing the construction of a secure NFC apparatus according to an embodiment of the present invention. Referring to FIG. 2, the NFC apparatus 200 includes an NFC unit 210, a protocol conversion unit 220, and a security module 230.

Figure 10:
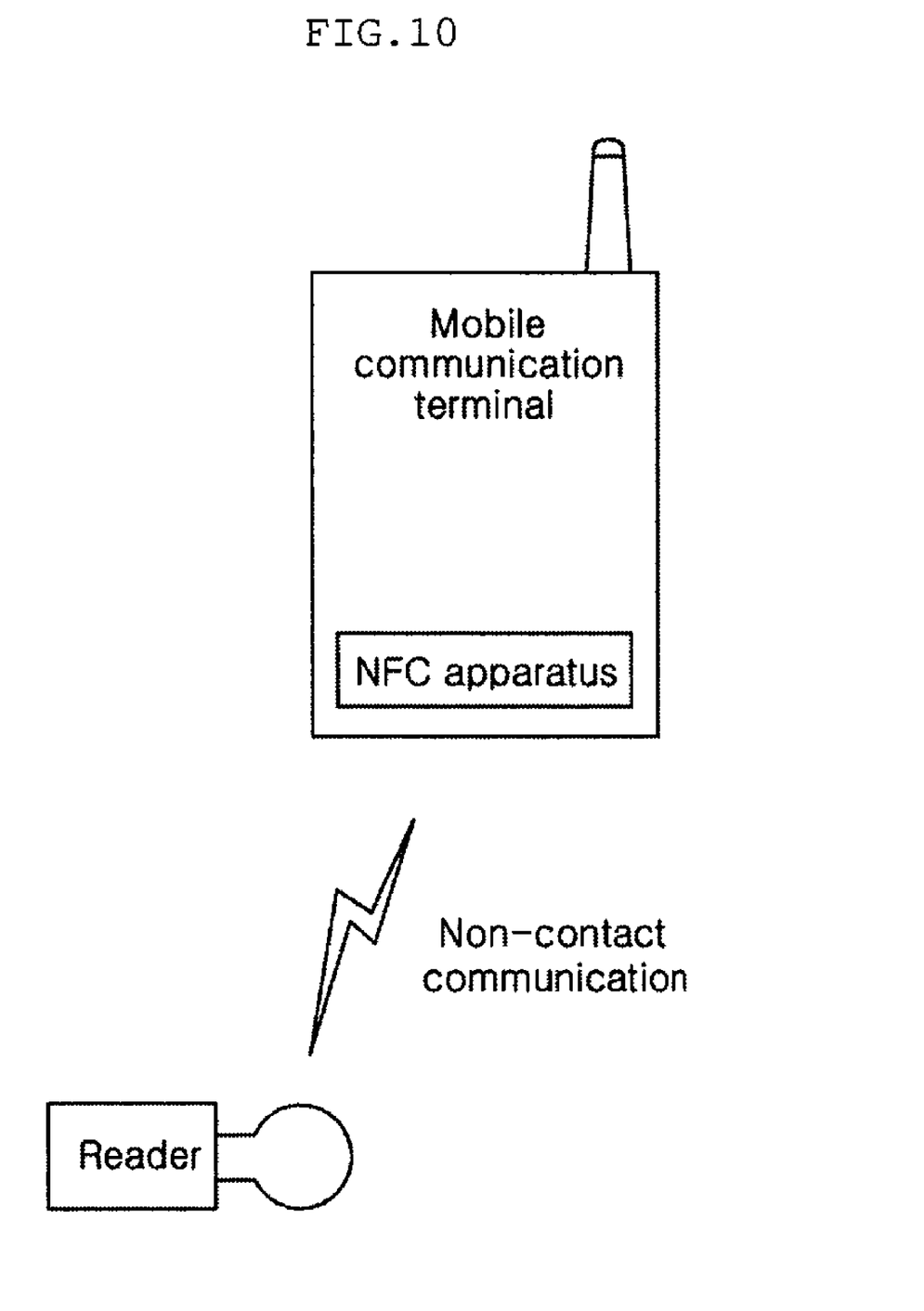
FIG. 10 is a diagram showing the relationship of a communication application between a mobile communication terminal equipped with the secure NFC apparatus and a reader, according to an embodiment of the present invention.
Figure 11:
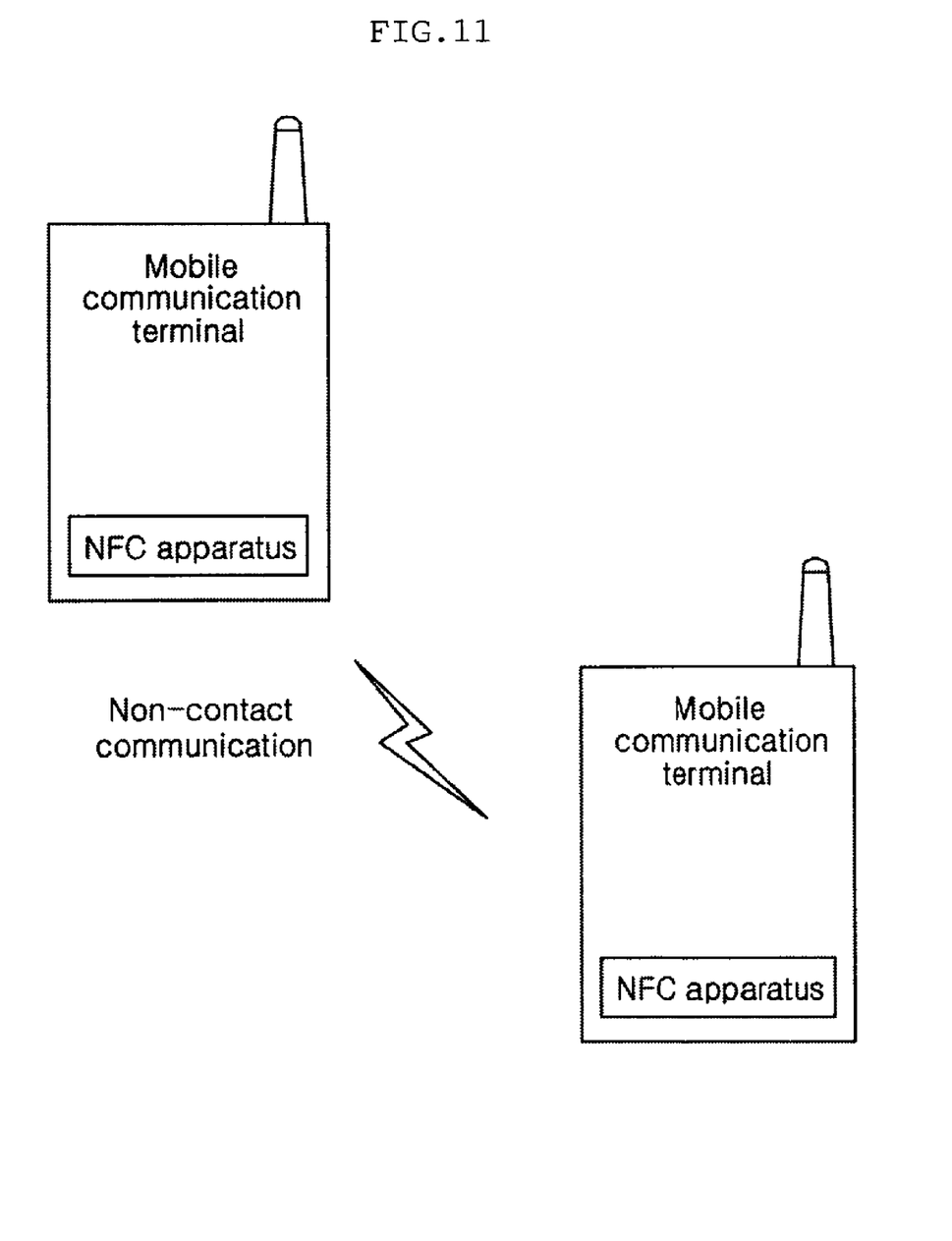
FIG. 11 is a diagram showing the relationship of a communication application between mobile communication terminals each equipped with the secure NFC apparatus, according to an embodiment of the present invention.

The secure NFC apparatus 200 may be mounted in a portable terminal, such as a mobile communication terminal. The secure NFC apparatus 200, as shown in FIG. 10, may perform the function of a traffic card or a smart card via communication with a reader. Furthermore, the present invention is proposed such that peers (that is, mobile communication terminals) equipped with secure NFC apparatuses 200 can exchange personal information with each other, as shown in FIG. 11.

More particularly, unlike the fact that a conventional secure NFC processor supports only communication with a specific security authentication module communicating based on the S2C interface, the present invention includes a protocol conversion unit 220 so that all security authentication modules, such as a contact smart card core chip based on the ISO 7816 protocol and a non-contact smart card core chip based on the ISO 14443 protocol, can be used as the security module 230.

The NFC unit 210 is an NFC processor that performs interfacing with a peer NFC apparatus for non-contact NFC. The NFC unit 210 can operate under the control of the host processor of a mobile communication terminal equipped with the secure NFC apparatus 200.

The NFC unit 210 receives a first base-band signal SigIn based on the S2C protocol from the protocol conversion unit 220, and processes the first signal SigIn into information in Radio Frequency (RF) form, which corresponds to the first signal SigIn. The NFC unit 210 transmits the generated information to a reader or a peer terminal via non-contact NFC.

The NFC unit 210 may receive RF information from the reader or the peer terminal via NFC. The NFC unit 210 may process the received RF information, generate a second base-band signal SigOut based on the S2C protocol, and transmit the generated second signal to the protocol conversion unit 220.

The protocol conversion unit 220 converts the protocols of signals input and output between the NFC unit 210 and the security module 230 into appropriate protocols, and then transmits the signals. For example, the protocol conversion unit 220 may convert the second signal SigOut based on the S2C protocol, which is output from the NFC unit 210, into a signal LA-LB based on the protocol for signals input to the security module 230, and output the converted signal to the security module 230. The protocol conversion unit 220 may also convert the signal LA-LB based on a corresponding protocol, which is output from the security module 230, into a first signal SigIn based on the S2C protocol, and output the converted signal to the NFC unit 210.

The security module 230 may be a general security authentication module, such as a contact smart card core chip based on the ISO 7816 protocol or a non-contact smart card core chip based on the ISO 14443 protocol. For example, the security module 230 operates in response to a signal LA-LB, input to the non-contact smart card core chip, and can output internal authentication information to LA-LB terminals.

Figure 3:
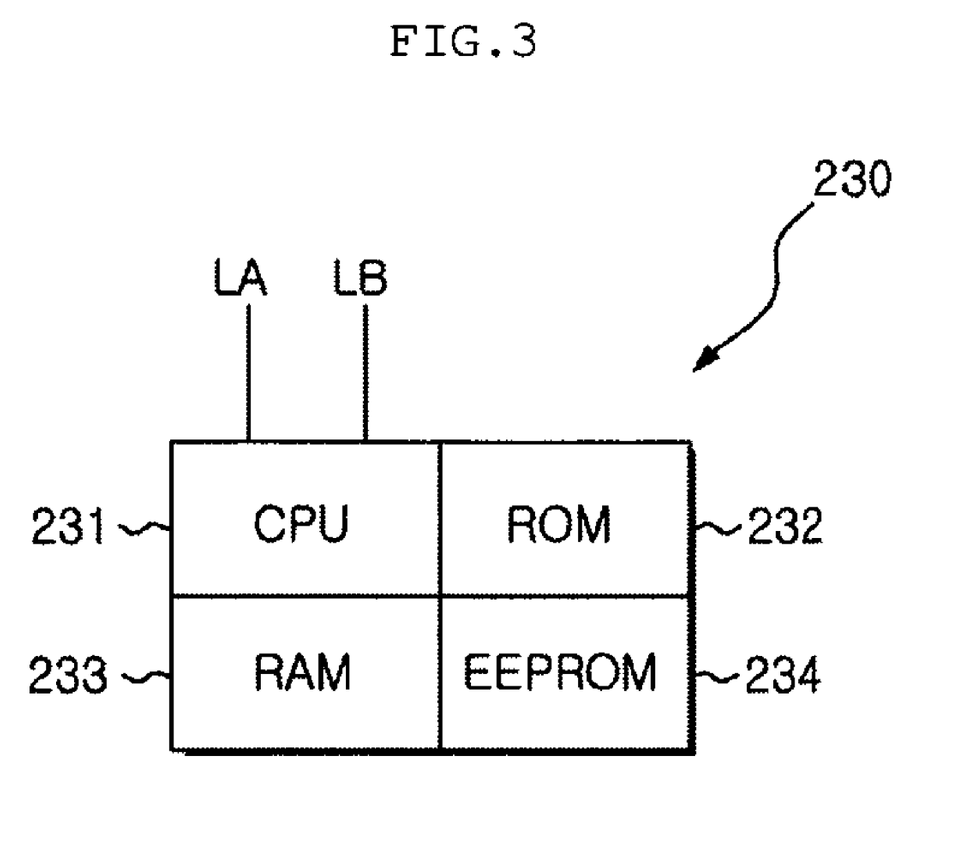
FIG. 3 is a diagram showing a detailed example of the security module of FIG. 2.

FIG. 3 shows a detailed block diagram of the security module 230 of FIG. 2. Referring to FIG. 3, the security module 230 may include a Central Processing Unit (CPU) 231, Read-Only Memory (ROM) 232, Random Access Memory (RAM) 233, and Electrically Erasable Programmable ROM (EEPROM 234). The CPU 231 is responsible for the overall control of the security module 230. The ROM 232 stores an overall system program for the operation of the security module 230. The RAM 233 stores temporary data necessary at the time of operation of internal data. The EEPROM 234 stores authentication information for transmission and reception in conjunction with an external card reader or other terminals.

Figure 4:
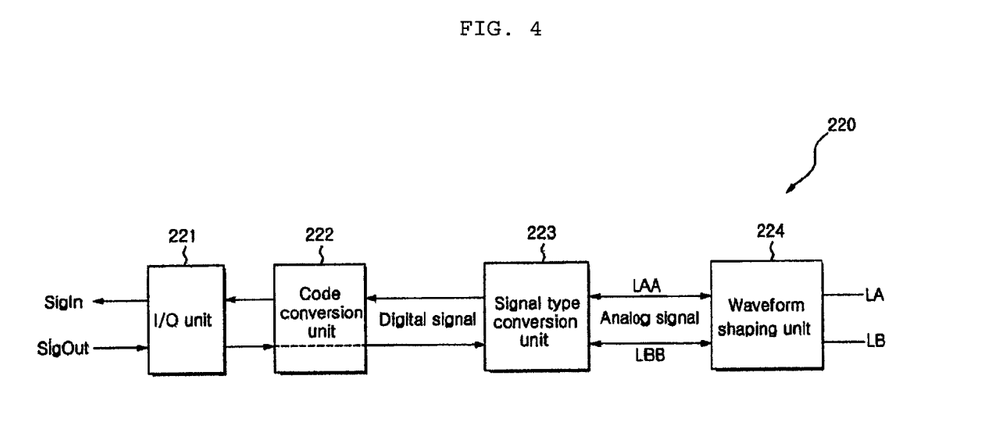
FIG. 4 is a detailed block diagram showing the protocol conversion unit of FIG. 2.

FIG. 4 is a detailed block diagram of the protocol conversion unit 220 of FIG. 2. Referring to FIG. 4, the protocol conversion unit 220 includes an I/O unit 221, a code conversion unit 222, a signal type conversion unit 223, and a waveform shaping unit 224.

The I/O unit 221 buffers a second signal SigOut, received from the NFC unit 210, and outputs the buffered signal SigOut to the code conversion unit 222. The I/O unit 221 also buffers an output signal received from the code conversion unit 222, and outputs the buffered signal SigIn to the NFC unit 210.

Figure 6:
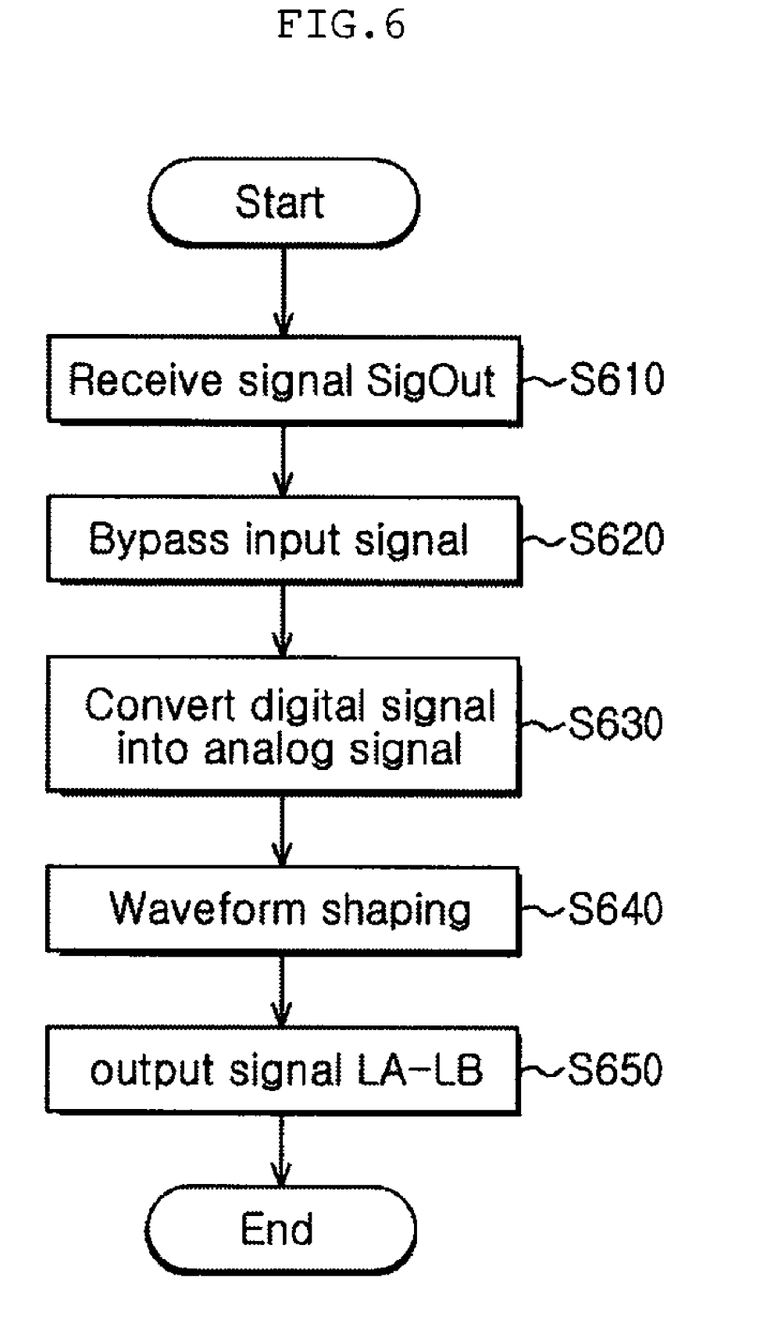
FIG. 6 is a flowchart showing a process in which a protocol conversion unit of FIG. 4 converts an S2C-based signal into a signal having a security module format.

An operation in which the protocol conversion unit 220 converts the S2C type second signal SigOut, which is received from the NFC unit 210, into a signal suitable for the security module 230 will be described with reference to FIG. 6.

When the code conversion unit 222 receives an input signal based on the S2C protocol from the I/O unit 221 at step S610, the code conversion unit 222 bypasses the input signal and outputs it to the signal type conversion unit 223 at step S620. The signal type conversion unit 223 converts a digital signal, which is received from the code conversion unit 222, into an analog signal, and outputs the converted analog signal to the waveform shaping unit 224 at step S630.

Figure 7:
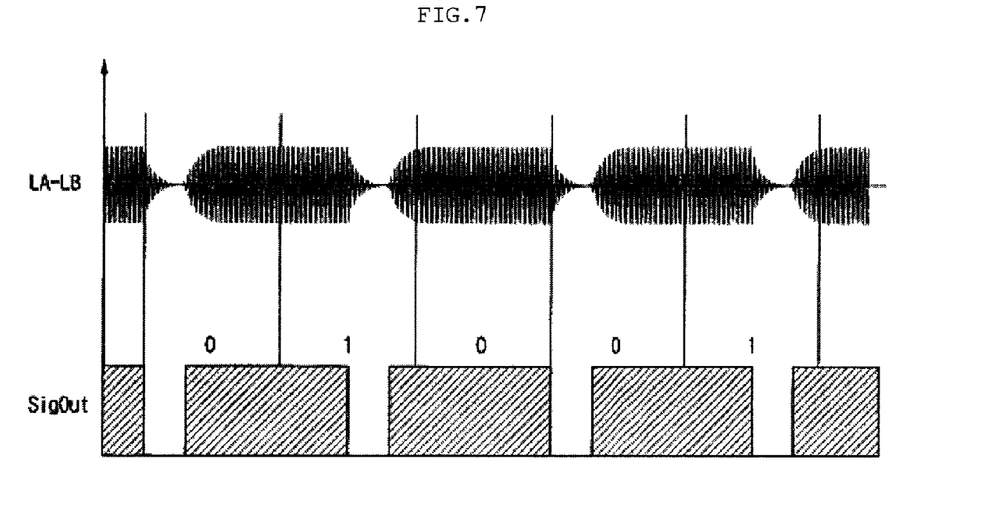
FIG. 7 is a waveform diagram illustrating examples of an S2C-based signal received from an NFC unit and a signal output from a security module.

For example, the signal SigOut from the code conversion unit 222 may be a digital signal coded using Miller coding, as shown in the lower view of FIG. 7. The analog signal, output to the waveform shaping unit 224, is a signal that is modulated and coded using Manchester coding, as shown in the upper view of FIG. 7.

As shown in FIG. 7, the signal type conversion unit 223 converts a signal into an analog signal having a constant frequency-based peak-to-peak level depending on the logic state of the Miller coding-based digital signal SigOut, output from the code conversion unit 222. In other words, the signal type conversion unit 223 converts a digital signal having a high logic state into an analog signal having a high peak-to-peak level, and converts a digital signal having a low logic state into an analog signal having a low peak-to-peak level.

The digital code based on Miller coding is based on a coding scheme in which a signal having a low logic state at the initial part of a constant period is considered to be "0" and a signal having a low logic state at the intermediate part of a constant period is considered to be "1", as shown in FIG. 7. The signal based on Manchester coding is based on a coding scheme in which a digital value based on Miller coding is modulated to a subcarrier type, as shown in FIG. 7.

Figure 5:
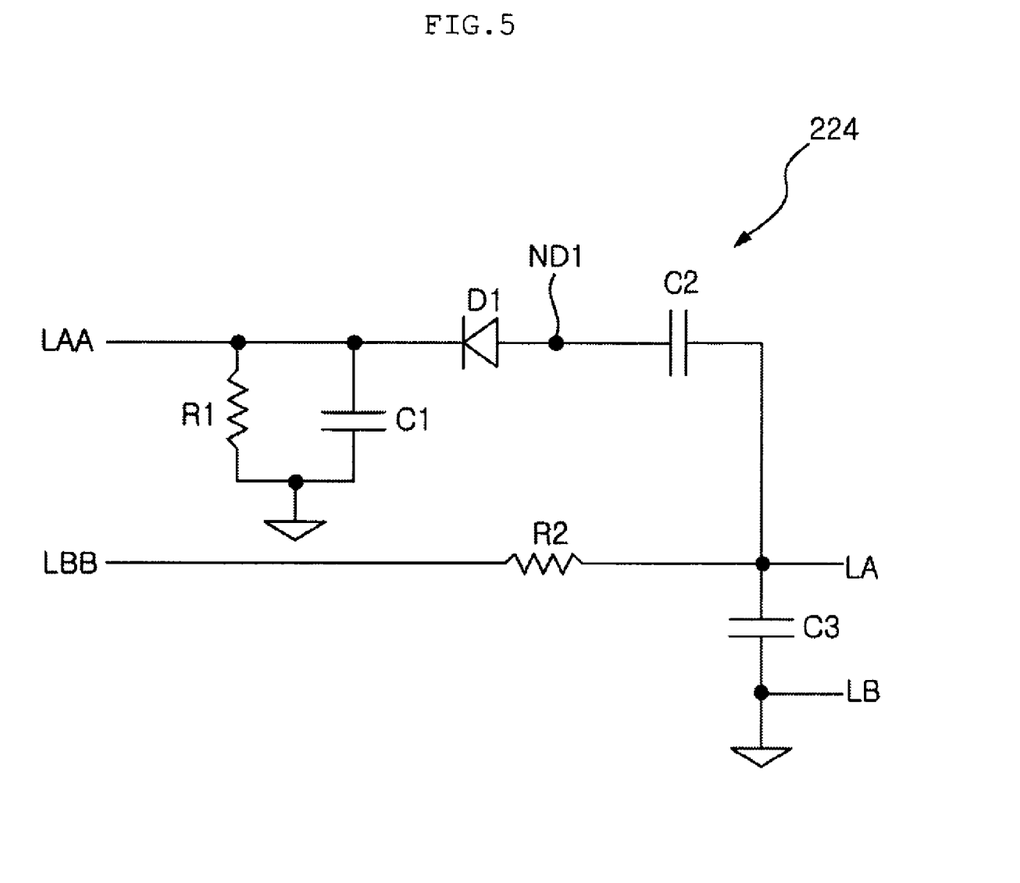
FIG. 5 is a detailed circuit diagram showing the waveform shaping unit of FIG. 4.

FIG. 5 is a detailed circuit diagram of the waveform shaping unit 224 of FIG. 4. Referring to FIG. 5, the waveform shaping unit 224 includes a diode D1, a first resistor R1, a second resistor R2, a first capacitor C1, a second capacitor C2, and a third capacitor C3. The circuit of FIG. 5 showing the waveform shaping unit 224 is only an example, therefore a variety of circuits for waveform shaping may be used.

The diode D1 is connected between a first terminal LAA, which is connected to the signal type conversion unit 223, and a first node ND1. The first resistor R1 is connected between the first terminal LAA, which is connected to the signal type conversion unit 223, and a ground GND. The first capacitor C1 is connected between the first terminal LAA, which is connected to the signal type conversion unit 223, and the ground GND. The second resistor R2 is connected between a second terminal LBB, which is connected to the signal type conversion unit 223, and a first terminal LA, which is connected to the security module 230. The second capacitor C2 is connected between the first node ND1 and the first terminal LA, which is connected to the security module 230. The third capacitor C3 is connected between the first terminal LA, which is connected to the security module 230, and a ground GND. The ground GND is connected as the second terminal LB of the security module 230.

As described above, the first terminal LAA of the signal type conversion unit 223 is connected to the cathode of the diode D1. The other terminal of the second resistor R2, which is connected to the first terminal LA of the security module 230, is connected to the second terminal LBB of the signal type conversion unit 223. Accordingly, the signal LA-LB of the terminals connected to the security module 230 is decreased in size in the waveform shaping unit 224 and then output to the signal type conversion unit 223, and the signal LAA-LBB from the signal type conversion unit 223 is increased in size in the waveform shaping unit 224 and then output to the security module 230, through the general operation of the diode D1 and the R-C filter type circuit operation of the waveform shaping unit 224.

That is, the size of the analog signal is converted through waveform shaping in the waveform shaping unit 224, and is then transferred to the security module 230 at step S650. In particular, the waveform shaping unit 224 performs waveform shaping so that the size of the signal LA-LB from the security module 230 is greater than that of the signal LAA-LBB from the signal type conversion unit 223 at step S640. For example, the signal LAA-LBB output to the signal type conversion unit 223 may have a peak-to-peak level of about 3 V and the signal LA-LB output to the security module 230 may have a peak-to-peak level of about 12 to 13 V.

FIG. 7 is a waveform diagram illustrating examples of a second signal SigOut and a signal LA-LB output to the security module 230 in a process in which the protocol conversion unit 220 converts the second signal SigOut based on the S2C method, which is received from the NFC unit 210, into the signal LA-LB suitable for the security module 230. As shown in FIG. 7, the second S2C-based signal SigOut from the NFC unit 210 is converted into an analog signal in the signal type conversion unit 223, is waveform-shaped into a constant peak-to-peak level in the waveform shaping unit 224, and is then transferred to the security module 230.

Figure 8:
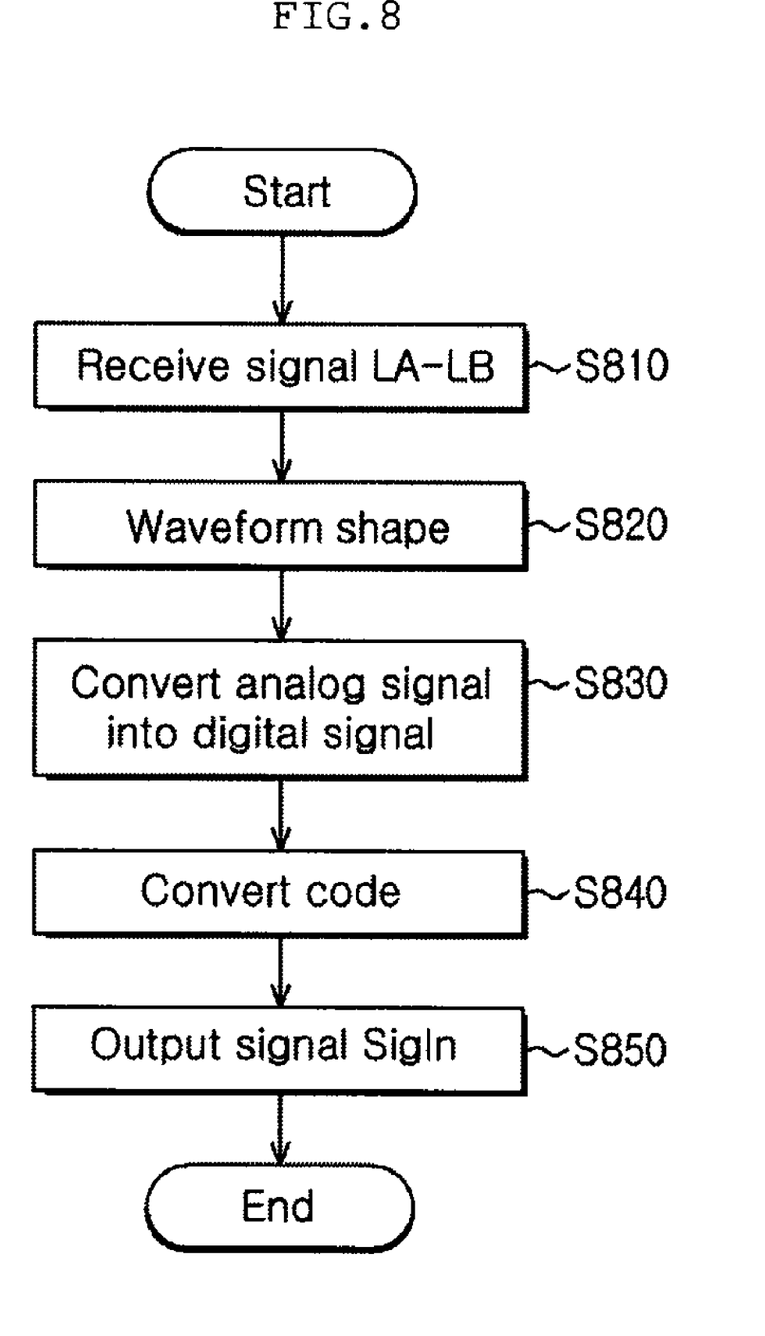
FIG. 8 is a flowchart showing a process in which the protocol conversion unit of FIG. 4 converts a signal in the security module format into an S2C-based signal.

An operation in which the protocol conversion unit 220 converts the signal LA-LB, which is received from the security module 230, into the first signal SigIn based on the S2C method and transfers the converted signal to the NFC unit 210 will be described with reference to FIG. 8.

When the waveform shaping unit 224 receives the signal LA-LB from the security module 230 at step S810, the waveform shaping unit 224 shapes the waveform of the signal so that the peak-to-peak interval of the signal is decreased, and outputs the waveform-shaped signal to the signal type conversion unit 223 at step S820. The signal type conversion unit 223 samples the Manchester coding-based analog signal, which is received from the waveform shaping unit 224 (a signal into which LA-LB of FIG. 9 is waveform-shaped), at a constant frequency, converts the analog signal into a digital signal, and then outputs the digital signal to the code conversion unit 222 at step S830.

Figure 9:
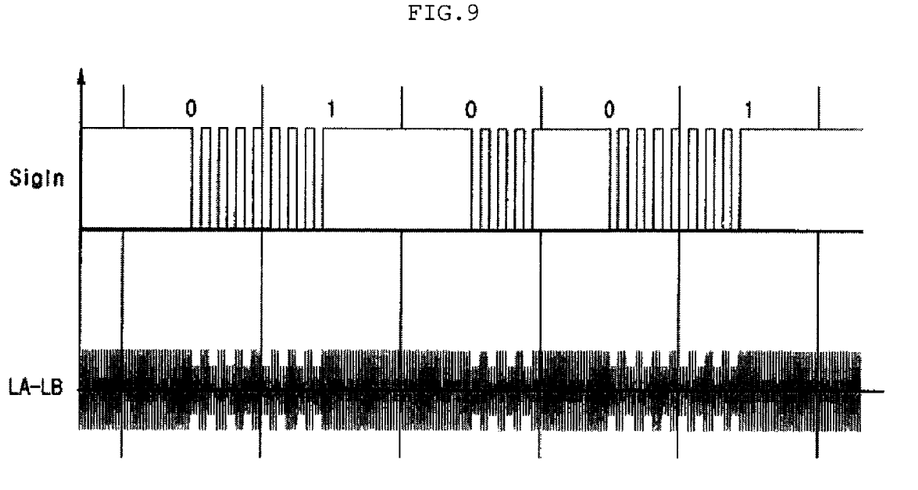
FIG. 9 is a waveform diagram showing examples of a signal received from the security module and an S2C-based signal output from the NFC unit.

When the code conversion unit 222 receives the signal coded through Manchester coding from the signal type conversion unit 223, the code conversion unit 222 converts the signal into the first signal SigIn coded through Miller coding at step S840, as shown in FIG. 9. The signal SigIn, converted in the code conversion unit 222 is transferred to the NFC unit 210 through the I/O unit 221 at step S850.

Meanwhile, the secure NFC apparatus 200 according to an embodiment of the present invention, which is shown in FIG. 2, may be mounted in a mobile communication terminal and communicate with a reader, as shown in FIG. 10.

For example, a user who desires to pass through a security gate can transmit authentication information to a reader for entry authentication through the antenna 211 of the secure NFC apparatus 200 by bringing the mobile communication terminal equipped with the secure NFC apparatus 200 close to a main body (that is, the reader) mounted in the security gate for entry authentication.

That is, when information requesting authentication is received from the reader through the antenna 211 of the secure NFC apparatus 200, information based on a received signal can be transmitted to the security module 230 through the NFC unit 210 and the protocol conversion unit 220. In this case, the security module 230 extracts authentication information, such as a user Identification (ID) for user identification, stored in the EEPROM 234 under the control of the CPU 231. The extracted authentication information can be transmitted to the reader through the protocol conversion unit 220 and the NFC unit 210. If corresponding authentication is successful in the reader, the user can pass through the security gate.

Furthermore, in the case where a reader for transportation or payment is used, a user brings a mobile communication terminal equipped with the secure NFC apparatus 200 close to the reader, and can use transportation or pay the cost if the authentication of the amount of charged money is successful in the reader.

Furthermore, the secure NFC apparatuses 200 according to an embodiment of the present invention, which is shown in FIG. 2, can be mounted in different mobile communication terminals and enable peer-to-peer communication, as shown in FIG. 11.

For example, many users currently store electronic name cards, photos, motion images, and/or telephone directories in their mobile communication terminals, and then use them. However, only when such personal information is newly input or downloaded at the time that terminals are changed, can users use personal information, which was stored in previous terminals, in current terminals.

However, in the present embodiment, such personal information can be managed in the security module 230 of the secure NFC apparatus 200 mounted in the mobile communication terminal. When personal information is managed in the security module 230, it is possible to move the personal information to a peer terminal through communication between mobile communication terminals.

For example, mobile communication terminals equipped with the secure NFC apparatuses 200 are brought close to each other, and one of the mobile communication terminals attempting to transmit personal information can send the personal information, along with authentication information, to the other mobile communication terminal through the antenna 211 of the secure NFC apparatus 200. When the other mobile communication terminal receives the authentication information and the personal information through the antenna 211 of the secure NFC apparatus 200, the other mobile communication terminal can transmit authentication information based on received signals to the security module 230 through the NFC unit 210 and the protocol conversion unit 220. In this case, the security module 230 can perform authentication under the control of the CPU 231, store the personal information included in the received signals in the EEPROM 234 if the authentication is successful, and manage the stored personal information.

As described above, in the secure NFC apparatus 200 according to an embodiment of the present invention, the signals SigIn and SigOut, which are input to and output from the NFC unit 210, are converted into signals compatible with the protocol of the security module 230 in the protocol conversion unit 220. The NFC unit 210 performs interfacing based on the S2C protocol. The security module 230 can transmit authentication information or perform authentication based on the protocol of a contact or non-contact smart card core chip.

As described above, in the secure NFC apparatus according to the present invention, signals based on the S2C protocol of NFC are converted into signals compatible with the protocols of other security authentication modules, such as a non-contact smart card. Therefore, the present invention is advantageous in that various security authentication modules can be mounted in the secure NFC apparatus and user authentication information managed in the security authentication modules can be used in an easily compatible fashion.

Furthermore, the present invention is advantageous in that data communication between portable terminals (that is, peers), such as mobile communication terminals, is freely performed, therefore personal information, such as electronic name cards, photos, moving images, and telephone directories, can be easily managed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A protocol converter for Near Field Communication (NFC), comprising:
   a code conversion unit for bypassing an input signal based on a first protocol, and converting an input signal based on a second protocol into a signal based on the first protocol and outputting the converted signal;
   a signal type conversion unit for converting the bypassed signal, which is received from the code conversion unit, into an analog signal and outputting the converted analog signal, and converting an analog input signal based on the second protocol into a digital signal and outputting the converted digital signal to the code conversion unit as an input signal based on the second protocol; and
   a waveform shaping unit for converting a size of the analog signal output from the signal type conversion unit and transferring the converted analog signal to the external module, and converting a size of the analog signal based on the second protocol, which is output from the external module, and outputting the converted analog signal to the signal type conversion unit as an analog input signal based on the second protocol.

2. The protocol converter of claim 1, wherein the waveform shaping unit performs waveform shaping so that a size of the signal transferred to the external module is greater than that of the signal transferred to the signal type conversion unit.

3. A secure Near Field Communication (NFC) apparatus, comprising:
   an NFC unit for transmitting information corresponding to a first signal based on a first protocol via non-contact NFC and generating a second signal based on the first protocol from information received via non-contact NFC;
   a protocol conversion unit for converting a signal based on a second protocol into a first signal based on the first protocol and converting the second signal based on the first protocol into a signal based on the second protocol; and
   a security module for receiving and outputting signals based on the second protocol, wherein the protocol conversion unit comprises:
   a code conversion unit for bypassing an input signal based on the first protocol, and converting an input signal based on the second protocol into a signal based on the first protocol and outputting the converted signal;
   a signal type conversion unit for converting the bypassed signal, which is received from the code conversion unit, into an analog signal and outputting the converted analog signal, and converting an analog input signal based on the second protocol into a digital signal and outputting the converted digital signal to the code conversion unit as an input signal based on the second protocol; and a waveform shaping unit for converting a size of the analog signal output from the signal type conversion unit and transferring the converted analog signal to the security module, and converting a size of the analog signal based on the second protocol, which is output from the security module, and outputting the converted analog signal to the signal type conversion unit.

4. The secure NFC apparatus of claim 3, wherein the signal based on the first protocol is a Miller-coded signal and the signal based on the second protocol is a Manchester-coded signal.

5. The secure NFC apparatus of claim 3, wherein the waveform shaping unit performs waveform shaping so that a size of the signal transferred to the security module is greater than that of the signal transferred to the signal type conversion unit.

6. The secure NFC apparatus of claim 3, wherein the waveform shaping unit comprises:

a diode connected between a first terminal, which is connected to the signal type conversion unit, and a first node;

a first resistor connected between the first terminal, which is connected to the signal type conversion unit, and a ground;

a first capacitor connected between the first terminal, which is connected to the signal type conversion unit, and the ground;

a second resistor connected between a second terminal, which is connected to the signal type conversion unit, and a first terminal, which is connected to the security module;

a second capacitor connected between the first node and the first terminal, which is connected to the security module; and a third capacitor connected between a first terminal, which is connected to the security module, and a ground;

wherein the ground is connected as a second terminal of the security module.

* * * * *